Sept. 13, 1955   A. BIRNBAUM   2,717,744
PROPELLING DEVICE

Filed Oct. 5, 1949   2 Sheets-Sheet 1

INVENTOR.
ARNOLD BIRNBAUM
BY Virgil F. Davico
Joseph Daleda
ATTORNEYS

Sept. 13, 1955  A. BIRNBAUM  2,717,744
PROPELLING DEVICE
Filed Oct. 5, 1949  2 Sheets-Sheet 2
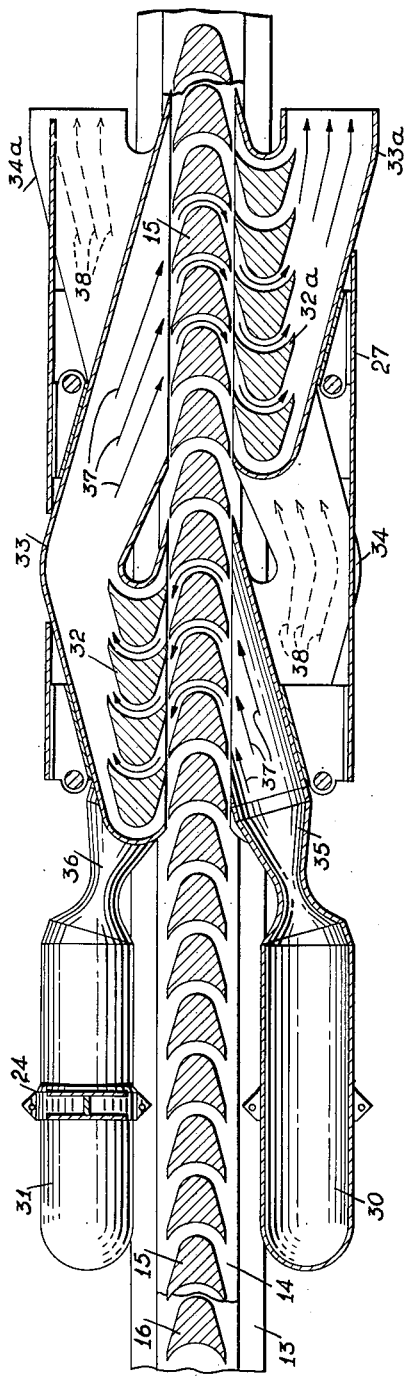
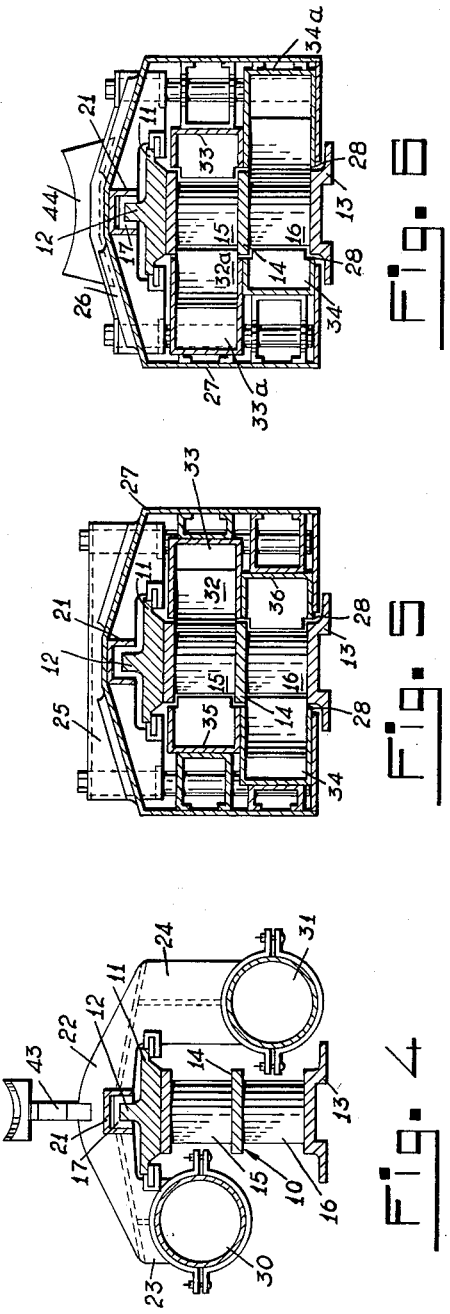
INVENTOR.
ARNOLD BIRNBAUM
BY
ATTORNEYS

United States Patent Office 2,717,744
Patented Sept. 13, 1955

2,717,744

PROPELLING DEVICE

Arnold Birnbaum, Irvington, N. J., assignor to The M. W. Kellogg Co., Jersey City, N. J., a corporation of Delaware Application October 5, 1949, Serial No. 119,634

10 Claims. (Cl. 244—63)

The present invention relates to a linear turbine propelling device, is an improvement over the propelling device disclosed in the pending application of Logan L. Dreibelbis, Serial No. 698,893, filed September 24, 1946, now U. S. Patent No. 2,606,725 of August 12, 1952, and more fully utilizes the available kinetic energy of the propellant medium.

Prior art propelling devices have serious limitations; for example: the split tube type has its propelling velocity limited to the subsonic range; the stationary ramp-movable-carriage type in which the missile, usually a rocket, supplies the energy, is limited in range, since a portion of the missile's fuel is used for propelling; a third type, disclosed in the above noted application, while an improvement over previous types in that speed and range are unlimited, does have the disadvantage of not fully employing the usable kinetic energy of the propellant fluid. The present invention is concerned primarily with an improvement of the last type of device and makes the maximum practical use of the available kinetic energy of the propellant fluid.

The primary object of the present invention is to provide a linear turbine propelling device which will operate at maximum efficiency over the widest possible velocity range and especially at improved operating efficiencies at low velocities.

Another object of the present invention is to provide a propulsion device of the character employing a linear turbine in which the greatest advantageous amount of the available energy of the propellant fluid is extracted through velocity compounding.

Still another object of the present invention is to provide a linear turbine propelling device which is sturdy and comparatively light in construction and wherein the energy released by the expanding propelling fluid is most efficiently utilized and directed towards accelerating the propelling device, as rapidly as possible, to speeds up to and through the sonic range.

A novel feature of the invention is the structure of the blading arrangements and reversing chambers mounted on the carriage of the device, which is used to absorb, in successive stages, some of the available kinetic energy from the propellant fluid and to convert it into additional carriage propelling thrusts.

Another novel feature is the construction of the final reversing chambers of the device to prevent any entrapment of propellant fluid, and so losing energy, when the velocity of the carriage is greater than the velocity of the propellant fluid at the entrance to these chambers.

Still another novel feature is the structure of the reversing chambers of the device so that the subdivided streams of the propellant fluid leaving the guide blades in these chambers are guided and directed as a single stream toward the unrestricted exit section of the chambers to obtain a jet reaction.

Various other objects, features and advantages of the present invention will be apparent from the following description and from an inspection of the accompanying drawings in which:

Fig. 3 is a section taken on line 3—3 of Fig. 1.

Fig. 4 is a sectional view taken on line 4—4 of Fig. 2.

Fig. 5 is a section taken on line 5—5 of Fig. 2; and

Fig. 6 is a section taken on line 6—6 of Fig. 2.

Figure 2:
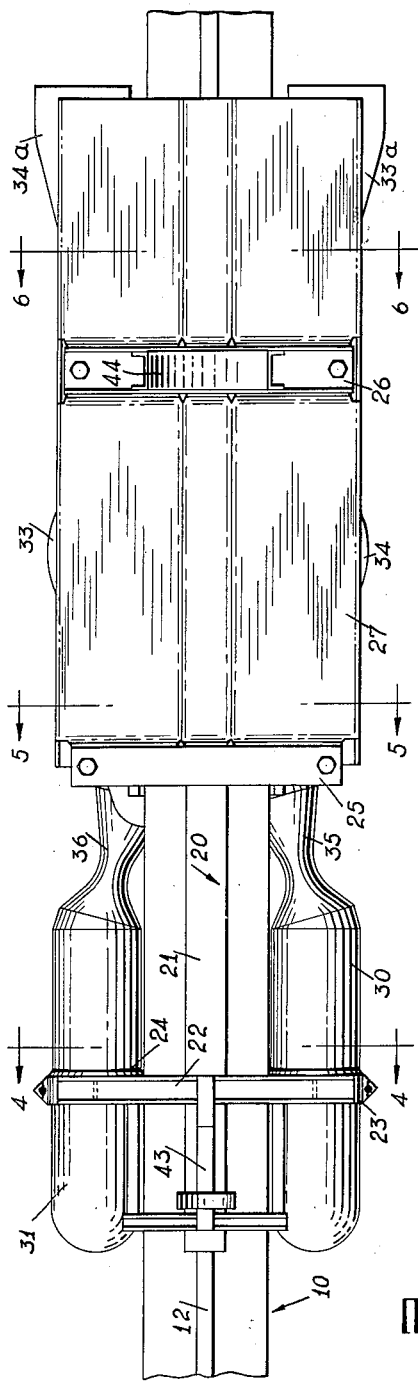
Fig. 2 is a plan view taken along line 2—2 of Fig. 1 with the body adapted to be airborne removed.
Figure 1:
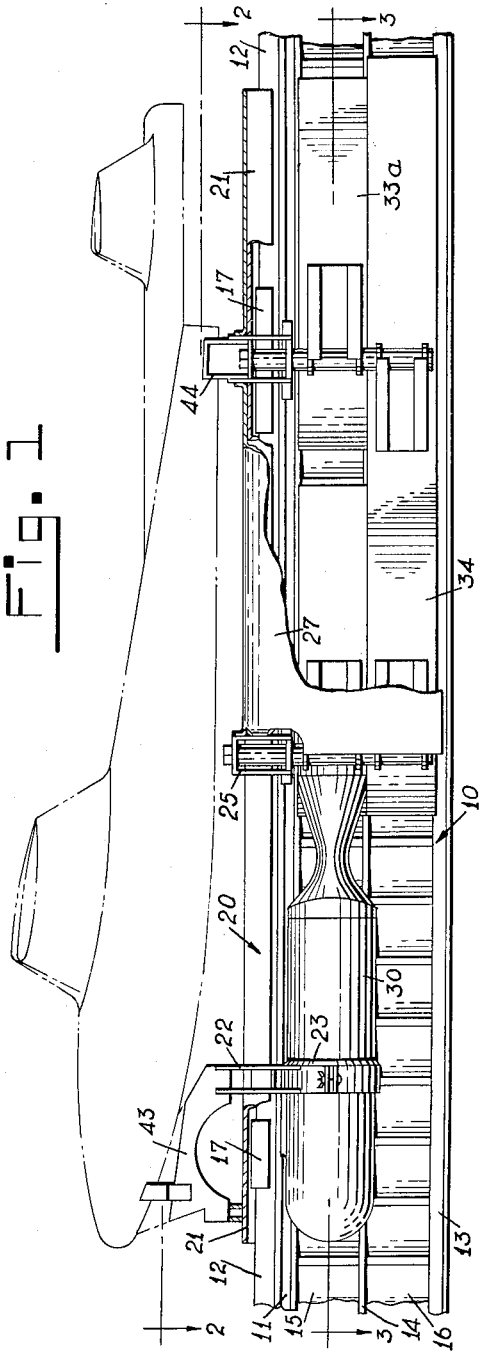
Fig. 1 is a side view of a propelling device embodying the presently preferred form of the invention, with the carriage cover partly removed, and with a body adapted to be airborne, positioned thereon for propelling.

The present invention is of general application and may be used to carry or propel bodies on a carriage along a fixed path, whether or not the bodies leave the carriage at the end of its movement. As specifically disclosed herein, it is especially suited for use in connection with the launching of bodies adapted to be airborne.

Referring to the drawings, the propelling device comprises a guideway 10, of extended length, in the form of a beam-like ramp fastened to the ground in a suitable manner (not shown) and slidably carrying a carriage 20, on which a body, adapted to be propelled, is detachably supported. The guideway 10 comprises an upper guide plate assembly 11 with an outwardly extending guide rib 12 thereon, a lower base plate 13, and a rail plate 14. All these plates are arranged parallel longitudinally and are rigidly interconnected by two rows of substantially parallel blades 15, 16, comprising the upper and lower rows of the fixed guide blades of the guideway and which correspond to a rotor of an impulse turbine of infinite radius. These guide blades extend substantially at right angles to the parallel plates and are rigidly connected thereto by welding or other well known means in the art and are arranged with the upper series in registry or alignment with the respective blades of the lower series, so that the guideway has great strength and rigidity, although it is comparatively light.

The carriage 20 is adapted to fit around the guideway and includes an elongated U-shaped channel 21 with a pair of saddles 17, 17 for receiving the rib 12, to form a slide guide therewith and also to aid in resisting the torsional thrust on the carriage 20 as it is propelled along the guideway 10. Mounted on channel 21 is front yoke 22, with depending arms 23 and 24 for supporting, respectively, the thrust cylinders 30 and 31 of the propulsion system. Other yokes 25 and 26 are for support of the reversing chambers, 33, 33a, 34, 34a, of the system, with the support fastenings shown in diagrammatic form in Figs. 5 and 6. The carriage also includes a carriage cover 27, generally tubular in form and open at its ends and surrounding the reversing chambers of the propulsion system. Along its under side, the carriage cover 27 has a longitudinal slot or opening defined by the longitudinal edges 28 which slide engage with the respective side edges of the base plate 13.

The front yoke 22 is provided with hook 43 while rear yoke 26 is provided with support 44 for mounting the body to be propelled, at the front and rear sections thereof, respectively.

The propulsion system of the carriage may consist of one or more rocket motor systems and, as disclosed, shows two fixedly mounted rocket motors 30, 31 disposed lengthwise on opposite sides of the guideway, and guide blades mounted in reversing chambers as shown respectively at 32, 32a and 33, 33a for rocket motor 30. The blades carried by the movable carriage have substantially the same configuration as fixed guide blades 15 and 16. The rocket motors 30 and 31 may be of any suitable type employing solid or liquid fuel and terminate at their rear outlet ends in nozzles 35 and 36 respectively, from which the propellant fluids pass in the form of high velocity fluid jets, which propel the carriage 20 along the guideway 10 by thrust reaction or recoil produced by these jets, in the conventional manner.

After discharge from the rocket nozzles 35 and 36, as much as 95% of the available energy may still be retained in the exhaust fluid. Therefore, if this exhaust is released at high velocity into the atmosphere, as in the prior art devices, a substantial amount of energy is wasted. Furthermore, the extent of power imparted to the carriage 20 merely by the jet thrusts is limited, and the carriage will therefore not be propelled at the desired high rate of acceleration, and will not attain supersonic speed, which, under certain conditions, is a desideratum.

As a feature of the present invention, available kinetic energy in the propellant fluids, emerging from the rocket nozzles 35 and 36, is converted by the blading in the reversing chambers into additional carriage propelling thrusts.

Considering the course of events following from the propulsive efforts of a single rocket motor 30, the propellant fluid, leaving this rocket motor as a jet at 37 strikes fixed guide blades 15 where a simple rocket reaction occurs and the jet flow is reversed 180° as indicated by the arrows in Fig. 3, so that the propulsive effort of the reversed fluid acts against reversing guide blades 32 in the first reversing chamber 33. Not only is energy for propulsion absorbed in this chamber, but there is another 180° reversal with the fluid being directed towards other fixed guide blades 15 where still another 180° reversal takes place. This reversal of the propellant fluid directs it against the final reversing guide blades 32a in the second reversing chamber 33a where additional energy for propulsion is absorbed and the final 180° reversal of fluid transpires, with the result that the fluid leaves the motor system in the direction parallel to the motion of the carriage after passing through two compounding stages during which passage kinetic energy has been extracted from the propellant fluid.

The total thrust imparted to the carriage is the summation of the original jet action thrusts from the rocket motors, the reaction thrusts from two fluid direction reversals occurring in the first and second reversing chambers and additional jet action thrusts at the unrestricted exits of the reversing chambers. Note that when the carriage is moving with a velocity greater than the velocity of the fluid entering the second reversing chamber, the fluid is not trapped in the second chamber with its open exhaust, as it would be, if the construction were similar to that of the first reversing chamber, where the fluid is diverted to re-enter fixed blading. Thus no energy from the carriage is withdrawn in order to accelerate the slower moving fluid to the velocity of the carriage, with the result that the final carriage velocity is higher. When the carriage velocity is less than that of the entering propellant fluid, the reaction against the blading in the second reversing chamber is the same as in the first reversing chamber.

The propelling device as disclosed herein includes rocket motors spaced on opposite sides of the launchway, one exhausting propellant fluid into the top set of fixed guide blades, the other exhausting propellant fluid into the bottom set of fixed guide blades, to produce a balanced set of forces and a high thrust. The flow of the propellant fluid from the second rocket follows a path of reversals similar to that of the fluid from the first rocket as described above and is shown by dotted lines 38.

The carriage may be designed to cut out the second compounding stage when the velocity of the carriage reaches or exceeds the velocity of the fluid entering the second stage. In addition this type of structure is capable of two ranges of thrusts since the propelling systems can be operated singly or jointly.

It would be possible to use a modification of the present device with a single compounding stage but this would be disadvantageous because of the great loss of available energy in the propellant fluid in the exhaust; to build a four stage device would result in a more efficient use of the propellant fluid but this advantage would be greatly reduced by the heavier and more complicated structure required.

It can be shown that even though fuel consumption for a two stage propelling device is about double that for the four stage device, the length of guideway required and the propelling time are almost equal. It is more important to note that the use of a two-stage configuration greatly reduces the complexity of the entire device without material effect on the performance, and results in a lighter and more mobile structure. With a lighter carriage, less dead weight need be accelerated, so that the final overall efficiency increases.

While the present invention has been disclosed as an improvement in a linear turbine propelling device, it is not intended that this application be restricted thereto but that the material contained herein be considered of general applicaion. The configuration of the nozzles, fixed guide blades, movable guide blades and reversing chambers in such a propelling device is a matter of design, for each individual application. A device of this character thereby affords a means whereby the maximum practical amount of kinetic energy of the propellant fluid is utilized to move a body along a rail or guideway of either extended or fixed length.

Since many changes and widely different embodiments of the present invention can be made without departing from the scope of the claims, it is intended that all matter contained herein shall be interpreted as illustrative and not in a limiting sense.

What is claimed is:

1. A propulsion device comprising a beam-like way, a carriage mounted on and substantially surrounding said way for slide movement therealong, high velocity jet generating means supported by said carriage for providing a thrust to move said carriage along said way, fixed guide means mounted on said way forming passages for reversing the flow of the exhaust received directly from said jet generating means, velocity compounding means carried by said carriage and adapted to receive said reversed exhaust flow for converting portions of the energy remaining in said exhaust into additional thrusts on said carriage, said last mentioned means comprising a reversing chamber, guide means therein arranged to form passages, and an unrestricted exit section, said last mentioned guide means and said fixed guide means having coplanar supports.

2. A propulsion device comprising a fixed elongated ramp, a carriage borne by and substantially surrounding said ramp for slide movement therealong, one or more unitary propulsion systems carried by said carriage, said one or more systems including high velocity fluid jet motor means adapted to discharge one or more jets of high velocity fluid therefrom in a direction to impart a thrust to said carriage for propelling said carriage along said ramp and reversing chambers with blading means mounted therein defining movable passageways, and other similar blading means arranged on said ramp defining fixed passageways for guiding and reversing the direction of flow of the exhaust received directly from said one or more jets against said reversing chamber blading means for conversion of portions of the energy remaining in said exhaust into additional thrusts directly effective on said carriage, said blading means, defining both movable and fixed passageways, being bounded by coplanar supporting means.

3. A launching device comprising a ramp-like member, a carriage member movable along and substantially surrounding said ramp-like member and adapted to carry a unit to be launched, means mounted on said carriage member for generating a high energy fluid jet to impart a thrust to said carriage member, means for absorbing some of the remaining available energy of said jet and convering it into additional thrusts on said carriage member including a plurality of blades defining energy compounding stages, one series thereof being rigidly fixed to said ramp-like member and defining fixed guide passageways and adapted to receive said fluid jet directly, the remaining series being carried by said carriage member and defining other passageways, said other passageways being adapted to transmit some of the available energy of said jet to said carriage member in the form of additional thrusts, said blades being confined between coplanar supports, and means for directing said jet through the several compounding stages in succession.

4. A launching device for a body adapted to be airborne comprising a fixed elongated ramp, a carriage separate from said body and movable along and substantially surrounding said ramp, said carriage being adapted to carry the body to be launched, a propulsion system mounted on said carriage including rocket motor means adapted to discharge one or more jets of high velocity fluid for imparting a thrust to said carriage and velocity compounding means comprising one or more reversing chambers, a series of stream guiding blades mounted in said one or more reversing chambers, and other means comprising a similar series of stream guiding blades rigid with said ramp, said other means diverting the exhaust stream received directly from said rocket motor means against said stream guiding blades of said velocity compounding means for conversion of portions of the available energy of said exhaust stream into additional thrusts on said carriage, both of said series of stream guiding blades being supported between parallel planes.

5. A propelling device comprising a guideway, a carriage assembly, adapted to carry a detachable body, slide embracing said guideway and enclosing a propulsive system including means for creating a high velocity jet and velocity compounding means consisting of reversing chambers, rows of blades defining movable passageways fixed within said reversing chambers, and guide means consisting of other rows of blades mounted on said guideway defining fixed passageways and adapted to communicate directly with said movable passageways, said guide means directing the exhaust received directly from said high velocity jet in the form of a fluid stream against said blades of said velocity compounding means to impart additional thrusts to said carriage assembly, all of said rows of blades having coplanar supports.

6. A propelling device comprising a fixed elongated ramp, a carriage, adapted to carry a detachable body, mounted for slide movement on and substantially surrounding said ramp, a propulsion system carried by said carriage including high velocity fluid jet motor means adapted to discharge one or more jets of high velocity fluid in a direction to impart a thrust to said carriage to propel said carriage along said ramp, means comprising a series of spaced blades rigid with said ramp defining fixed fluid passageways for receiving the exhaust directly from said one or more jets of high velocity fluid and reversing the direction of flow of said exhaust, and other means comprising reversing chambers and series of blades spaced rigidly within said reversing chambers defining movable fluid passageways communicating with said fixed fluid passageways for receiving said exhaust diverted from said ramp blades for absorbing and converting some of the energy of said exhaust into additional thrusts directly effective on said carriage, both series of blades defining passageways being fixed between parallel planes.

7. A propelling device comprising a fixed elongated ramp, a carriage mounted for slide movement on and substantially surrounding said ramp and adapted to carry a body to be launched, high velocity fluid jet motor means mounted on said carriage and adapted to discharge one or more jets of high velocity fluid therefrom in a direction to impart a propelling thrust to said carriage for movement along said ramp, guide means fixed to said ramp defining passageways for diverting the exhaust received directly from said one or more jets, a reversing chamber carried by said carriage, other guide means fixedly mounted in said reversing chamber and defining passageways for receiving said diverted exhaust and absorbing, through the reaction from reversing the flow of said diverted exhaust, some of the available energy from said exhaust for conversion into an additional propelling thrust to said carriage, said reversing chamber including means for directing the separate streams of the reversed exhaust in a nozzle-like manner against said ramp guide means for converting further portions of available energy of said exhaust into an additional propelling thrust through jet action, said ramp guide means in turn reversing the flow of and diverting said exhaust against other guide means mounted in a second reversing chamber and defining passageways for receiving said rediverted exhaust for absorbing still further portions of available energy remaining in said exhaust for conversion into an additional propelling thrust to said carriage, all of said guide means being supported in coplanar relationship.

8. A launching device for a body adapted to be airborne, comprising a beam-like ramp, a carriage slide mounted on said ramp, said carriage being adapted to carry the body to be launched, reversing chambers carried by said carriage, one or more rocket motors borne by said carriage for imparting a thrust to said carriage and means for converting at least part of the available energy of the jet exhaust from said one or more rocket motors into additional thrusts on said carriage, said means comprising a plurality of guide blades defining passageways, one series of said blades being fixedly mounted in said ramp and extending therealong and other series of guide blades being arranged in said reversing chambers defining movable passageways for receiving the jet exhaust diverted by said ramp mounted blades, said ramp mounted blades receiving said jet exhaust directed at it rearwardly and obliquely to the longitudinal axis of the ramp and diverting it forwardly and obliquely away from said longitudinal axis towards one of said other series of blades mounted in said reversing chambers, said reversing chamber series of guide blades being disposed for receiving said diverted exhaust directed toward it and also for reversing the direction of flow of said diverted exhaust rearwardly and obliquely away from said longitudinal axis in subdivided streams, said reversing chamber being shaped for directing said subdivided streams as a jet toward the fixed passageways where said diverted and reversed exhaust is rediverted forwardly and obliquely away from said longitudinal axis against another series of blades in another reversing chamber defining other movable passageways, where the direction of flow of said rediverted exhaust is reversed rearwardly towards an exit, said reversing operations involving transfers of energy to the carriage in the form of thrusts.

9. The combination of a velocity compounded launcher comprising a guideway, fixed guide means defining fluid passageways mounted on said guideway, a carriage, adapted to carry the body to be launched, in slide contact with and substantially encompassing said guideway, means for generating one or more high velocity jets carried by said carriage, reversing chambers adapted to receive the exhaust from said jet generating means after initial diversion through said guideway passageways, and other guide means in said reversing chambers carried by said carriage spaced for receiving and directing said diverted exhaust in subdivided streams to unrestricted portions of said reversing chambers in a nozzle like manner, said other guide means and said reversing chambers comprising velocity compounding stages by which available energy in said exhaust is extracted to impart additional launching thrusts to said carriage, said guide means defining passageways being confined between coplanar supports.

10. A propulsion system for propelling or launching a body capable of being airborne comprising a beam-like way with fixed guide means defining fluid channels, a carriage adapted to carry the body to be propelled or launched slide mounted on said way, one or more means to generate high velocity jets supported by said carriage, reversing chambers carried by said carriage including guide means therein defining fluid channels and unrestricted exit sections directed toward said way guide means, the exhaust from said high velocity jets providing the initial propelling or launching jet thrust to said carriage, said exhaust being diverted by said way guide means against said reversing chamber guide means where a reaction occurs to absorb a part of the available energy of said exhaust and to impart to said carriage an additional propelling or launching thrust, said latter guide means reversing the direction of flow of said exhaust in subdivided streams toward said unrestricted exit section of said reversing chambers where said exhaust is redirected in a nozzle like manner against said way guide means to impart a further propelling or launching jet thrust to said carriage, said way guide means again diverting said exhaust against another series of guide means defining fluid channels in another of said reversing chambers to absorb a further portion of the available energy in said exhaust and to impart an additional propelling or launching thrust to said carriage by reaction, said last mentioned reversing chamber being shaped to direct the subdivided streams of said exhaust to an unrestricted exit section for absorbing a further portion of the available energy of said exhaust by additional jet thrust action.

References Cited in the file of this patent

UNITED STATES PATENTS

| | | |
|---|---|---|
| 785,014 | Ludeman | Mar. 14, 1905 |
| 996,324 | De Ferranti | June 27, 1911 |
| 1,411,597 | Trask | Apr. 4, 1922 |
| 2,307,125 | Goddard | Jan. 5, 1943 |
| 2,493,013 | Nelson | Jan. 3, 1950 |